United States Patent
Koerner et al.

(10) Patent No.: US 12,116,499 B2
(45) Date of Patent: Oct. 15, 2024

(54) WATER BORNE SEALER

(71) Applicant: AXALTA COATING SYSTEMS IP CO., LLC, Wilmington, DE (US)

(72) Inventors: Michael R. Koerner, Media, PA (US); John V. Haslett, Lake Orion, MI (US); Matthew Pinter, Grosse Pointe Woods, MI (US); Manish Mittal, Cupertino, CA (US); Margaret Joyce Schooler, Hockessin, DE (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 397 days.

(21) Appl. No.: 16/995,543

(22) Filed: Aug. 17, 2020

(65) Prior Publication Data

US 2021/0062034 A1 Mar. 4, 2021

Related U.S. Application Data

(60) Provisional application No. 62/893,406, filed on Aug. 29, 2019.

(51) Int. Cl.
| | |
|---|---|
| *C09D 175/06* | (2006.01) |
| *B05D 7/00* | (2006.01) |
| *B05D 7/16* | (2006.01) |
| *C09D 133/08* | (2006.01) |

(52) U.S. Cl.
CPC ............. *C09D 175/06* (2013.01); *B05D 7/16* (2013.01); *B05D 7/574* (2013.01); *C09D 133/08* (2013.01)

(58) Field of Classification Search
CPC ................ C09D 175/06; C09D 133/08; C09D 175/04; C09D 5/002; B05D 7/16; B05D 7/574; B05D 7/50; B05D 2202/15; B05D 2202/25; C08G 18/0866; C08G 18/73; C08G 18/44; C08L 75/06
See application file for complete search history.

(56) References Cited

U.S. PATENT DOCUMENTS

| | | | |
|---|---|---|---|
| 7,888,439 B2 | 2/2011 | Renkes et al. | |
| 2006/0247357 A1* | 11/2006 | Willems | C08F 265/02 524/502 |
| 2007/0282070 A1 | 12/2007 | Adams et al. | |
| 2014/0088246 A1* | 3/2014 | Morikami | C08G 18/44 524/591 |
| 2016/0177123 A1* | 6/2016 | Spyrou | B05D 3/06 427/493 |
| 2017/0136493 A1 | 5/2017 | Lamers et al. | |
| 2020/0095448 A1* | 3/2020 | Woodworth | C09D 127/16 |

FOREIGN PATENT DOCUMENTS

| | | | |
|---|---|---|---|
| CN | 1918251 A | 2/2007 | |
| CN | 102686626 A | 9/2012 | |
| CN | 107810244 A | 3/2018 | |
| EP | 1213334 A1 | 6/2002 | |
| WO | 2011075718 A1 | 6/2011 | |
| WO | WO-2013147701 A1 * | 10/2013 | ......... C08G 18/0809 |
| WO | 2019109025 A1 | 6/2019 | |

OTHER PUBLICATIONS

Elementis ("Nalzin FA 379", 2009) (Year: 2009).*

* cited by examiner

*Primary Examiner* — Robert S Jones, Jr.
*Assistant Examiner* — Jiangtian Xu
(74) *Attorney, Agent, or Firm* — Lorenz & Kopf, LLP

(57) ABSTRACT

Water-borne sealer compositions, multilayer coated substrates, and methods for building up a multilayer coating on a substrate are provided. In one example, a water-borne sealer composition includes an acrylic latex resin, a polyurethane dispersion (PUD), and water. The acrylic latex resin is free of a core-shell latex. The PUD includes a hydroxyl functional reaction product of polyisocyanate and a polyol including a polycarbonate diol.

19 Claims, No Drawings

WATER BORNE SEALER

CROSS-REFERENCE TO RELATED APPLICATIONS

This application is related to and claims all available benefit of U.S. Provisional Patent Application 62/893,406 filed Aug. 29, 2019, the entire contents of which are herein incorporated by reference.

TECHNICAL FIELD

The technical field relates generally to coatings, and more particularly to water-borne sealer compositions, multilayer coated substrates including said compositions, and methods of building up multilayer coatings on a substrate.

BACKGROUND

To repair coatings on metal substrates, for example in the automotive refinish industry, the damaged coating is sometimes removed down to the bare substrate and a multilayer coating stack is applied. Solvent borne coatings are commonly used to apply a primer directly to the bare substrate then a typical sequence of sealer and topcoats are applied over the primer. In the case of replacement parts, the sealer is commonly applied direct to the e-coat layer.

When water-borne sealers are used, refinishers obtain the benefits of reduced levels of harmful volatile solvents (VOC) in the work place and compliance with general safety and environmental regulations. But even with water-borne materials, the industry is still challenged by the requirement for high productivity systems, where the painter ideally does not have to wait for full film formation and crosslinking in the just applied layer before proceeding to apply subsequent layers.

Other challenges include improving mechanical properties so that the final multilayer film develops suitable physical properties such as flexibility, adhesion, corrosion resistance and chip and moisture resistance. In addition, a multilayer stack including a water-borne sealer has to provide for ease of application so that a smooth uniform film is formed without defects. Sealers are used to provide a uniform surface, and to hide or dampen scratches for sanding process. When used for spot repairs, the sealer must leave a smooth "feather edge" that is undetectable when topcoat is applied.

Accordingly, it is desirable to provide a water-borne sealer composition, a multilayer coated substrate, and a method for building up a multilayer coating on a substrate that addresses one or more of the foregoing issues in an ergonomically efficient manner. Furthermore, other desirable features and characteristics of the present disclosure will become apparent from the subsequent detailed description and the appended claims, taken in conjunction with this background.

SUMMARY

Water-borne sealer compositions, multilayer coated substrates, and methods for building up a multilayer coating on a substrate are provided herein. In accordance with an exemplary embodiment, the water-borne sealer composition includes an acrylic latex resin, a polyurethane dispersion (PUD), and water. The acrylic latex resin is free of a core-shell latex. The PUD includes a hydroxyl functional reaction product of a polyisocyanate and a polyol including a polycarbonate diol.

In one aspect, the water-borne sealer composition further includes one or more pigments.

In another aspect, the water-borne sealer composition further includes a rust inhibitor.

In yet another aspect, the polyisocyanate includes hexane diisocyanate.

In one aspect, the water-borne sealer composition further includes an activator that includes a polyisocyanate crosslinker having an isocyanate functionality of greater than 2.

In another aspect, the crosslinker is an isocyanurate.

In yet another aspect, the polyol includes a polyester and a polycarbonate diol.

In accordance with an exemplary embodiment, the multilayer coated substrate includes a substrate, a sealer composition applied directly on the substrate, and at least one topcoat applied on top of the sealer composition. The sealer composition is the water-borne sealant composition.

In one aspect, the substrate includes a base substrate and a primer applied on top of the base substrate and the sealer composition is applied on top of the primer.

In another aspect, the substrate includes a base substrate and an electrocoat applied on top of the base substrate and the sealer composition is applied on top of the electrocoat.

In yet another aspect, the substrate includes a base substrate selected from aluminum and steel.

In one aspect, the multilayer coated substrate is a painted vehicle component.

In accordance with an exemplary embodiment, the method of building up a multilayer coating on the substrate includes a) applying the water-borne sealer composition on top of the substrate to make a sealer coat and b) applied at least one topcoat on top of the sealer coat.

In one aspect, the substrate includes a base substrate and a primer applied in top of the base substrate and the water-borne sealer composition is applied on top of the primer.

In another aspect, the substrate includes a base substrate and an electrocoat applied on top of the base substrate and the water-borne sealer composition is applied on top of the electrocoat.

In yet another aspect, the substrate includes a base substrate selected from aluminum and steel.

In one aspect, the product of step b) is a painted vehicle component.

In another aspect, the sealer coat is allowed to flash before applying the topcoat.

In yet another aspect, the topcoat is applied before the sealer coat reaches a coalesced state.

In one aspect, the topcoat is applied before the sealer coat is matte.

DETAILED DESCRIPTION

The following detailed description is merely exemplary in nature and is not intended to limit the various embodiments or the application and uses thereof Furthermore, there is no intention to be bound by any theory presented in the preceding background or the following detailed description.

Various embodiments contemplated herein relate to water-borne sealer compositions. In one embodiment, a water borne sealant composition includes 1) a fully crosslinked acrylic resin; 2) a hydrophobic polyurethane; and 3) water, with optional pigment and rust inhibitors. In various embodiments, the polyurethane is the reaction product of a polyester-polycarbonate polyol blend with a polyisocyanate. For water dispersibility or solubility, the polyurethane is chain extended during phase inversion into water to incorporate a carboxyl group into the polyurethane. The formula also contains agents such as water soluble organic amines that neutralize the carboxyl group and solubilize the polyurethane. The acrylic resin is one that lacks a core shell structure and is crosslinked throughout the bulk of the polymer.

Surprisingly, it has been found that combining the acrylic and the polyurethane resins gives a compatible and stable composition that provides the benefits described herein. On its own, the crosslinked acrylic can have a limited coalescence behavior. But the polyurethane coalesces faster and is compatible with the acrylic latex, allowing the polyurethane to coalesce around the latex during film formation. The fast coalescence property makes using a sealer composition having both resins desirability for the high productivity need for the modern automotive refinish industry.

In various embodiments, a water borne sealant composition includes an acrylic resin, a prepolymer, and water. The acrylic resin is crosslinked at every stage of polymerization and differs from and therefore is not or is free of a core-shell latex. The prepolymer is a hydroxyl functional reaction product of a polyisocyanate and a polyol including a polycarbonate diol. In an embodiment, the diol is s elected from a mixture of polycarbonate diol and polyester.

Optionally, the composition further includes other ingredients such as pigments and rust inhibitors, along with conventional dispersants, rheology control agents, stabilizers, and the like. In certain embodiments, the polyisocyanate includes an aliphatic isocyanate such as hexane diisocyanate.

Before use, the sealer composition containing the acrylic and urethane resins along with optional components is spiked with an activator that reacts with the prepolymer. The activator includes a polyisocyanate crosslinker having an isocyanate functionality of greater than 2, and in an embodiment is conveniently selected from commercially available activators in the form of isocyanurates.

The water borne sealer compositions are applied along with other coating compositions to make a multilayer coated substrate such as a painted vehicle component. Here, the sealer composition is applied directly on a substrate that can be either (to illustrate in the vehicle component context) a base substrate like bare metal or sanded metal, or that bare metal further treated with other compositions such as a primer or an electrocoat. However the substrate is prepared, a sealer composition as set forth herein is applied to the substrate to form a sealer layer, and one or more topcoats is applied on the sealer layer. The result of the process is a multilayer coated substrate including the substrate, a sealer composition applied directly on the substrate; and at least one topcoat applied on top of the sealer composition.

This way of describing the product created when the water-borne sealer compositions are used with other coating compositions is conventional. It is to be understood that the multilayer coated substrate includes coated substrates wherein the individual layers range from uncured or partially cured to completely cured. Those skilled in the art know that the coated substrates described as they are above are made by applying the respective compositions one on top of the other and subjecting the thing made to finishing steps such as baking and curing to form the individual layers of the multilayer coated substrates. In time after application, all of the individual layers will cure by mechanisms known to those of skill in the art, such as moisture cure, coalescence and film formation, and the completion of crosslinking reactions. This applies also to the sealer composition layer, where because of the fast coalescence and early film build, the subsequent topcoat layer or layers can be applied before the sealant has completely cured.

The substrate to be coated sequentially with sealer and topcoat is either the base substrate (such as bare metal) or else is the base substrate further treated with other layers such as a conventional primer or electrocoat. However, the surface of the base substrate is prepared, the sealer composition is applied, and topcoat is applied over it. The nature of the resins in the sealer compositions provide advantages in productivity when topcoating to produce a finished product like a painted and repaired vehicle component.

In various embodiments, a method of building up a multilayer coating on a substrate includes applying a water-borne sealer composition as described herein on the substrate to make a sealer coat and applying at least one topcoat on the sealer coat. Advantageously, the topcoat can be applied before the sealer layer has completely cured, which provides a productive process. Before cure in this sense is understood to mean that the sealer composition applied to the substrate has not reached its final state of coalescence, that not all the volatiles have been removed from the sealer layer, or that the sealer layer has not reached a matte state.

Substrate

The substrate can be metallic or non-metallic and if metallic can be ferrous or non-ferrous. Non-metallic substrates include polymeric, plastic, polyester, polyolefin, polyamide, cellulosic, polystyrene, polyacrylic, poly(ethylene naphthalate), polypropylene, polyethylene, nylon, EVOH, poly(lactic acid), poly(ethylene terephthalate) (PET), polycarbonate, polycarbonate acrylonitrile butadiene styrene ("PC/ABS"), polyamide, polymer composites and the like. Car parts typically formed from thermoplastic and thermoset materials include bumpers and trim.

Metal substrates include ferrous metals, non-ferrous metals and combinations thereof. Suitable ferrous metals include iron, steel, and alloys thereof. Non-limiting examples of useful steel materials include cold rolled steel, pickled steel, steel surface-treated with any of zinc metal, zinc compounds and zinc alloys (including electrogalvanized steel, hot-dipped galvanized steel, GALVANNEAL steel, and steel plated with zinc alloy,) and/or zinc-iron alloys. Also, aluminum, aluminum alloys, zinc-aluminum alloys such as GALFAN, GALVALUME, aluminum plated steel and aluminum alloy plated steel substrates may be used.

The substrate may alternatively include more than one metal or metal alloy in that the substrate may be a combination of two or more metal substrates assembled together such as hot-dipped galvanized steel assembled with aluminum substrates. The substrate may alternatively include a composite material such as a fiberglass composite. It is desirable to have a coating system which can be applied to both metal and non-metal parts. The substrate may include part of a vehicle. "Vehicle" is used herein in its broadest sense and includes all types of vehicles, such as but not limited to airplanes, helicopters, cars, trucks, buses, vans, golf carts, motorcycles, bicycles, railroad cars, tanks and the like. It will be appreciated that the portion of the vehicle that is coated according to the present invention may vary depending on why the coating is being used.

The shape of the substrate can be in the form of a sheet, plate, bar, rod or any shape desired, but it is usually in the form of an automobile part, such as a body, door, fender, hood or bumper. The thickness of the substrate can vary as desired.

The substrates to be used may be bare substrates. By "bare" is meant a virgin substrate that has not been treated with (or has been stripped of) any pretreatment compositions such as conventional phosphating baths, heavy metal rinses, etc. Additionally, bare metal substrates being used in the present invention may be a cut edge of a substrate that is otherwise treated and/or coated over the rest of its surface. Alternatively, the substrates may undergo one or more treatment steps known in the art prior to the application of the curable film-forming composition.

Before depositing any coating compositions upon the surface of the substrate, it is common practice, though not necessary, to remove foreign matter or previously applied paints such as OEM coatings from the surface by thoroughly stripping, cleaning and degreasing the surface. When the substrate is not an existing vehicle part, such cleaning typically takes place after forming the substrate (stamping, welding, etc.) into an end-use shape. The surface of the substrate can be cleaned by physical or chemical means, or both, such as mechanically abrading the surface (e.g., sanding) or cleaning/degreasing with commercially available alkaline or acidic cleaning agents which are well known to those skilled in the art, such as sodium metasilicate and sodium hydroxide.

Primer Coating—First Coating

When a primer coat is used in order to form a first coating on the substrate upon which a sealer will be deposited according to the current teachings, the primer can be selected from any suitable commercial product sold for that purpose. Non-limiting disclosure of applying primers is found in instructions from the commercial suppliers and in the Examples section below.

Electrocoat

Optionally a base substrate is subjected to application of an electrocoat layer before the sealer composition is to be applied. Suitable electrocoat formulae and compositions are commercially available and are well known in the coatings field.

Sealer Composition

The sealer composition contains a fully crosslinked acrylic resin and a hydrophobic polyurethane resin selected for compatibility and quick film build. Advantageously, the sealer composition also contains a stabilized amount of both pigment and rust preventer. In various embodiments, the sealer composition includes the binder resins (acrylic and polyurethane) plus the pigment and rust inhibitor.

The purpose of applying a sealer over a repair area is to provide a smooth and consistent surface on top of which may be applied the repair topcoat layers, preferably without sanding. The sealer is conventionally applied in one coat at a dry film thickness around 25 microns. The sealer may be applied over a previously applied primer to hide the sand scratch marks produced when sanding the primer. Without the sealer, these sanding marks may be transmitted through to the basecoat and are visible as an optical defect in the repair part. A sealer may also be applied to a partial sand-through repair spot to negate the often variable surface energies created by the multiple exposed surfaces. These variable surface energies sometimes lead to optical defects visible in the basecoat layer (known as "ringing"). In this case, the sealer provides a consistent surface energy layer across the surface, on top of which the topcoat is applied. Because the sealer is applied prior to the repair topcoat and is generally not sanded, the "feather-out" area towards the edge of the repair where the contiguous sealer film blends into the original, un-sanded area should be smooth enough to be top-coated without additional processing. It is further desirable for the sealer to dry and be processable as soon as practical, for instance within 10 to 15 minutes after application.

Sealer Composition—Acrylic Latex Resin

The acrylic resin in the sealer composition is an aqueous binder latex and is preferably a fully crosslinked acrylic latex and is not a core shell type. Together with the polyurethane resin, it contributes to the development of a rheological/physical structure relatively early in the film coalescence period. In various embodiments the acrylic resin is a standard resin like those that are used in conventional commercial base coats.

By "aqueous binder lattices", it is meant water-dispersed emulsion polymers, i.e. water-dispersed polymer particles prepared by emulsion polymerizing free-radically polymerizable olefinically unsaturated monomers, said emulsion polymers being usable as film-forming binders in waterborne coating compositions, particularly in water-borne base coats of base coat/clear coat finishes.

The acrylic latex binders are called "fully crosslinked" to distinguish them from lattices characterized by a "core-shell" morphology. Fully crosslinked aqueous binder lattices are produced by a multistage, preferably two-stage emulsion polymerization. Mixtures A and B of olefinically unsaturated monomers to be free-radically polymerized are polymerized under conventional conditions, known to the person skilled in the art, of a free-radical polymerization performed in an aqueous emulsion, i.e. using one or more emulsifiers and with the addition of one or more initiators which are thermally dissociable into free radicals. In order to ensure the formation of a crosslinked or even gel structure in the polymer products formed in each stage of the emulsion polymerization, olefinically polyunsaturated monomers are used and copolymerized in each stage of the emulsion polymerization.

Fully crosslinked acrylic resins are described in WO2006/118974 and U.S. Pat. No. 7,888,439, the relevant disclosures of which are hereby incorporated by reference. Monounsaturated olefinic free radically polymerizable monomers are polymerized in at least two stages in the presence of polyunsaturated olefinic monomers during both stages. The aqueous binder lattices are produced by multistage emulsion polymerization; olefinically polyunsaturated monomers are copolymerized in all the stages of the emulsion polymerization and olefinically monounsaturated monomers with acid groups are copolymerized in the first stage of the emulsion polymerization. After completion of the first stage of the emulsion polymerization, acid groups on the incorporated monomers are neutralized.

Examples of olefinically polyunsaturated, free-radically polymerizable monomers include divinylbenzene, hexanediol di(meth)acrylate, ethylene and propylene glycol di(meth)acrylate, 1,3- and 1,4-butanediol di(meth)acrylate, vinyl (meth)acrylate, allyl (meth)acrylate, diallyl phthalate, glycerol tri(meth)acrylate, trimethylolpropane tri(meth)acrylate, pentaerythritol tetra(meth)acrylate, di- and tripropylene glycol di(meth)acrylate, and hexamethylene bis(meth)acrylamide. As in conventional usage, (meth)acrylic means acrylic and/or methacrylic and (meth)acrylate means acrylate and methacrylate.

Examples of olefinically monounsaturated, free-radically polymerizable monomers without functional groups are monovinyl aromatic compounds such as styrene, vinyltoluene; vinyl ethers and vinyl esters, such as vinyl acetate and vinyl versatate; maleic, fumaric, tetrahydrophthalic acid dialkyl esters; and (cyclo)alkyl (meth)acrylates, such as methyl (meth)acrylate, ethyl (meth)acrylate, propyl (meth)acrylate, butyl (meth)acrylate, isobutyl (meth)acrylate, tert.-butyl (meth)acrylate, hexyl (meth)acrylate, cyclohexyl (meth)acrylate, ethylhexyl (meth)acrylate, decyl (meth)acrylate, dodecyl (meth)acrylate, hexadecyl (meth)acrylate, lauryl (meth)acrylate and isobornyl (meth)acrylate. As is conventional, (meth)acrylate means methacrylate and/or acrylate, Examples of olefinically monounsaturated, free-radically polymerizable monomers with functional groups are monounsaturated monomers with at least one hydroxyl group, such as allyl alcohol; hydroxyalkyl (meth)acrylates such as, for example, hydroxyethyl (meth)acrylate, and the hydroxypropyl (meth)acrylates, hydroxybutyl (meth)acrylates isomeric with regard to the position of the hydroxyl group.

Examples of olefinically monounsaturated, free-radically polymerizable monomers with at least one acid group are olefinically monounsaturated monomers containing carboxyl groups, such as, for example, (meth)acrylic, itaconic, crotonic, isocrotonic, aconitic, maleic and fumaric acid, semi-esters of maleic and fumaric acid and carboxyalkyl esters of (meth)acrylic acid, for example, beta-carboxyethyl acrylate and adducts of hydroxyalkyl (meth)acrylates with carboxylic anhydrides, such as, for example, phthalic acid mono-2-(meth)acryloyloxyethyl ester.

Sealer Composition—Polyurethane Dispersions (PUD)

The polyurethane dispersions are built from a base diol into a prepolymer and then phase inverted into water to make a dispersion. Polyurethane dispersions are known from U.S. Pat. No. 6,147,155, the disclosure of which is hereby incorporated by reference.

The polyurethane of the sealer composition is a hydrophobic polyurethane prepared by reacting polyols with polyisocyanates. The polyols include polycarbonate polyols such are described in U.S. Pat. No. 9,018,334, the disclosure of which is hereby incorporated by reference. The presence of the polycarbonate diols in the polyurethane dispersions is believed to contribute to the compatibility and other favorable properties in sealer compositions described herein. Suitable polycarbonate diols are commercially available, for example from Covestro.

Polycarbonate diols are prepared by reacting a diol with a carbonate compound or a compound that turns into a carbonate under the reaction conditions.

Suitable diols for the reaction include 1,3-cyclohexanedimethanol, 1,4-cyclohexanedimethanol, ethylene glycol, 1,3-propanediol, neopentyl glycol, 1,4-butanediol, 2-isopropyl-1,4-butanediol, 1,5-pentanediol, 3-methyl-1,5-pentanediol, 2,4-dimethyl-1,5-pentanediol, 2,4-diethyl-1,5-pentanediol, 1,6-hexanediol, 2-ethyl-1,6-hexanediol, 1,7-heptanediol, 1,8-octanediol, 2-methyl-1,8-octanediol, 1,9-nonanediol, 1,10-decanediol, 1,3-cyclohexanediol, 1,4-cyclohexanediol, and 2-bis(4-hydroxycyclohexyl)-propane.

Carbonate compounds include alkylene carbonates, diaryl carbonates, dialkyl carbonates, dioxolanones, hexanediol bis-chlorocarbonates, phosgene, and urea. The alkylene carbonates include ethylene carbonate, trimethylene carbonate, 1,2-propylene carbonate, 5-methyl-1,3-dioxane-2-one, 1,2-butylene carbonate, 1,3-butylene carbonate, 1,2-pentylene carbonate, and the like. Moreover, dialkyl carbonates include dimethyl carbonate, diethyl carbonate, di-n-butyl carbonate, and the like and the diaryl carbonates include diphenyl carbonate.

Polyols having dual functionality such as dihydroxy acids are also suitable, to incorporate acid functional groups into the resulting polyurethane. Examples include dihydroxycarboxylic acids such as dihydroxypropionic acid, dimethylol propionic acid, dimethylol acetic acid, dimethylol butyric acid, dihydroxysuccinic acid, and dihydroxybenzoic acid. Polymeric polyols such as acrylics and polyester polyols may also be used. Such polymeric polyols may additionally have acid functional groups.

The organic polyisocyanate which is used to prepare the polyurethane can be an aliphatic or an aromatic polyisocyanate or a mixture of the two. Diisocyanates are most often used, although higher polyisocyanates can be used in place of or in combination with diisocyanates. Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate.

As noted above, the polyurethanes can be prepared with unreacted carboxylic acid groups, which upon neutralization with bases such as amines allows for dispersion into aqueous medium. Neutralization of acid groups on the polymer may be done using, for example, inorganic bases such as ammonium hydroxide or amines such as dimethylethanolamine, diisopropanolamine, triethylamine, and the like.

Sealer Composition—Pigments

The sealer compositions optionally contain a pigment. In various embodiments these include so-called neutral or achromatic pigments that are meant to be compatible and not interfere with later applied color coats such as the topcoats described herein. Neutral pigments include those that are black, white, gray, or beige and are formulated into the sealer compositions using conventional pigment dispersants. Non-limiting examples of pigments include talc, barium sulfate, kaolin, titanium dioxide, and carbon black.

Sealer Composition—Rust Inhibitors

The sealers optionally and preferably contain a rust inhibitor to fight the tendency of the sealer to induce rust, called flash rust, on an underlying ferrous metal substrate. Suitable inhibitors are based on sodium nitrite, for example. their use is illustrated in the Examples section below.

The following examples are provided for illustration purposes only and are not meant to limit the various embodiments of the coating composition in any way.

EXAMPLES

Example 1

Pigment Dispersions

Production of WB sealer requires the production of three Pigmented Dispersions first:

Extender Pigment Dispersion

| Ingredient Number | Ingredient Description | Ingredient Amount (wt %) |
|---|---|---|
| 1 | Dispersant Resin (available from Axalta) | 5.97 |
| 2 | Dipropylene glycol monomethyl ether | 4.52 |

| Ingredient Number | Ingredient Description | Ingredient Amount (wt %) |
|---|---|---|
| 3 | Pentanol | 1.51 |
| 4 | DI Water | 36.70 |
| 5 | Amino Methyl Propanol | 0.10 |
| 6 | 50% Surfynol ® 104 surfactant in ethylene glycol monobutyl ether | 2.02 |
| 7 | Talc | 17.29 |
| 8 | Barium Sulfate | 11.35 |
| 9 | Kaolin | 20.54 |
|  | TOTAL | 100.00 |

White Prime Pigment Dispersion

| Ingredient Number | Ingredient Description | Ingredient Amount (wt %) |
|---|---|---|
| 1 | Dispersant Resin (available from Axalta) | 2.47 |
| 2 | 50% Surfynol ® 104 surfactant in ethylene glycol monbutyl ether | 1.50 |
| 3 | Acrylic Resin (available from Axalta) | 3.15 |
| 4 | aminomethylpropanol | 0.20 |
| 5 | DI Water | 24.68 |
| 6 | Titanium Dioxide | 68.00 |
|  | TOTAL | 100.00 |

Black Prime Pigment Dispersion

| Ingredient Number | Ingredient Description | Ingredient Amount (wt %) |
|---|---|---|
| 1 | Solsperse ® 27000 dispersant | 12.80 |
| 2 | 50% Surfynol ® 104 surfactant in ethylene glycol monobutyl ether | 1.00 |
| 3 | aminomethylpropanol | 2.20 |
| 4 | DI Water | 68.00 |
| 5 | Carbon Black | 16.00 |
|  | TOTAL | 100.00 |

All dispersions are loaded into a pre-mix vessel, mixed with a Cowles Blade until uniform consistency. The Extender Dispersion is then milled to a fineness reading of 15 microns or less. The Prime Pigment Dispersions are ground until transparency is adequate.

Example 2

Water-Borne Sealer Example Loads

| Ingredient Number | Ingredient Description | Sealer A Ingredient Amount (wt %) | Sealer B Ingredient Amount (wt %) | comparison Sealer C Ingredient Amount (wt %) | comparison Sealer D Ingredient Amount (wt %) |
|---|---|---|---|---|---|
| 1 | DI Water | 13.24 | 11.44 | 12.86 | 2.61 |
| 2 | propylene glycol monomethyl ether | 2.23 | 2.23 | 2.23 | 2.23 |
| 3 | Pentanol | 2.77 | 2.77 | 2.77 | 2.77 |
| 4 | Acrysol ™ RM-12W thickener | 0.53 | 0.53 | 0.53 | 0.53 |
| 5 | Polyurethane with polycarbonate in diol &triethanolamine (per invention) | 23.43 | 33.07 | — | 23.43 |
| 6 | polyurethane w/o polycarbonatein diol (available from Axalta) | — | — | 23.81 | — |
| 7 | acrylic with full crosslinking (per invention) | 19.51 | 11.67 | 19.51 | — |
| 8 | core shell acrylic (available from Axalta) | — | — | — | 30.14 |
| 9 | 10% Dimethyl-ethanolamine in water | 0.48 | 0.48 | 0.48 | 0.48 |
| 10 | White Dispersion (as described above) | 10.21 | 10.21 | 10.21 | 10.21 |
| 11 | Black Dispersion (as described above) | 1.61 | 1.61 | 1.61 | 1.61 |

-continued

| Ingredient Number | Ingredient Description | Sealer A Ingredient Amount (wt %) | Sealer B Ingredient Amount (wt %) | comparison Sealer C Ingredient Amount (wt %) | comparison Sealer D Ingredient Amount (wt %) |
|---|---|---|---|---|---|
| 12 | Extender Dispersion (as described above) | 25.95 | 25.95 | 25.95 | 25.95 |
| 13 | Halox ®Flash-X ® 150 rust inhibitor | 0.04 | 0.04 | 0.04 | 0.04 |
| | TOTAL | 100.00 | 100.00 | 100.00 | 100.00 |

Example 3

Application of Sealers A, B, C, and D

Substrates
1. Cold Rolled Steel that were coated with commercially available Axalta AquaEC™ 4027 electrocoat and baked at target conditions.
2. Aluminum panels that were coated with gray Coil Coat and baked at target conditions.

These panels were purchased from ACT Test Panels. They were scuffed with Scotch-Brite™ Pads, wiped clean with isopropanol, then tack rag wiped before applying the Sealers.

Activation of the Sealers

All of the sealers were activated by adding 5% by volume commercially available Axalta isocyanate activator WB2075™ (70% isocyanate/30% PM acetate—available from Axalta), then thoroughly mixing by hand using a spatula.

Spray Application

A SATAjet® 5000 RP spray gun with a 1.3 mm tip was used with 23 psi to apply one coat at 0.8 to 1.0 mils dry film build. A wedge was also sprayed from 1.0 to 0.0 mils dry film build over both substrates to evaluate feathered edge/fine droplet smoothness and appearance. All panels were sprayed in a vertical position. Spray booth conditions were 70 to 75° F. and 50% to 65% relative humidity.

After application the panels were allowed to flash 1 minute, then an air blower or an air knife was used until the panels were no longer glossy or wet looking. The panels were then topcoated with commercially available:

1—Axalta Cromax® Pro waterborne basecoat/LE8700S™ premium appearance clear coat—flashed and baked per Cromax® Technical Data Sheet processes.

2—Axalta ChromaPremier® solventborne basecoat/LE8300S™ productive clear coat—flashed and baked per ChromaPremier® Technical Data Sheet processes.

Example 4

Sealer Only Results

Wet Sealer Testing

Shelf life viscosities were done by Brookfield Model DV-II+ Viscometer with a #2 Spindle at 5 rpm.

Shelf Life Results—Ambient

| Test Description | Sealer A | Sealer B | comparison Sealer C | comparison Sealer D |
|---|---|---|---|---|
| Initial O.L. visc. | 280 cP | 320 cP | 168 cP | 1128 cP |
| 1 month | 312 cP | 416 cP | 168 cP | 1328 cP |
| 2 month | 392 cP | 440 cP | 200 cP | 1632 cP |
| 3 month | 416 cP | 528 cP | 208 cP | 2064 cP |
| Overall Result | Acceptable/Pass | Acceptable/Pass | Acceptable/Pass | Unacceptable/Fail |

Shelf Life Results 120° F.

| Test Description | Sealer A | Sealer B | comparison Sealer C | comparison Sealer D |
|---|---|---|---|---|
| Initial O.L. visc. | 280 cP | 320 cP | 168 cP | 1128 cP |
| 1 month | 880 cP | 992 cP | 320 cP | 2608 cP |
| 2 month | 976 cP | 1088 cP | 552 cP | 3448 cP |
| 3 month | 1120 cP | 1256 cP | 656 cP | 5752 cP |
| Overall Result | Acceptable/Pass | Acceptable/Pass | Acceptable/Pass | Unacceptable/Fail |

Pot life viscosities were done with a Brookfield CAP 2000+ Viscometer using a #10 spindle at 50 rpm.

Pot life Results

| Test Description | Sealer A | Sealer B | comparison Sealer C | comparison Sealer D (after 5% H2O add) |
|---|---|---|---|---|
| 0 minute | 78.3 cP | 99.0 cP | 72.1 cP | 100.3 cP |
| 30 minute | 108.8 cP | 123.2 cP | 105.1 cP | 103.4 cP |
| 60 minute | 114.8 cP | 140.6 cP | 114.8 cP | 130.2 cP |
| Pot Life Result | Acceptable/Pass | Acceptable/Pass | Acceptable/Pass | Unacceptable/Fail |

Dry times were measured by stopwatch and reflect the amount of time passing from end of spray to substantial loss of gloss. This includes the 1 minute ambient flash time+the amount of time needed to blow dry with an air blower/air knife. Flash rust was done by spraying a sanded cold-rolled steel panel, flashing for one minute, then putting the panel into a 100% humidity cabinet for 30 minutes.

Wet Panel Results

| Test Description | Sealer A | Sealer B | comparison Sealer C | comparison Sealer D |
|---|---|---|---|---|
| DRY TIME (time to no gloss) (=time to topcoat) | 4'55" | 5'30" | 9'05" | 15'10" |
| Dry Time Result | Acceptable/Pass | Acceptable/Pass | Unacceptable/Fail | Unacceptable/Fail |
| Flash Rust | no rust = Pass | no rust = Pass | no rust = Pass | no rust = Pass |

Dry Testing

Sealer Only Dry Panel Testing

Sealer only appearance was measured by using a Taylor Hobson® S100 profilometer on the full film and on the feathered edge areas of the panels. This was used because the gloss was too low to be measured by a wavescan. Crosslinking progress was evaluated by putting acetone on a disposable wipe and using it to rub the sealer in the full film area 30 times back and forth. The amount of Sealer rubbed off on the wipe was then noted and a Pass/Fail scale was used. Hardness was evaluated using Tukon indentation and Persoz pendulum measurements. Tukon measurements were taken with a Clark Microhardness Tester model CM-402 AT. Persoz measurements were taken with a Byk Pendulum Hardness Tester.

Sealer Only Dry Panel Results

| Test Description | Sealer A | Sealer B | comparison Sealer C | comparison Sealer D |
|---|---|---|---|---|
| Full Film profilometer | 8 microns | 9 microns | 9 microns | 14 microns |
| Feathered Edge profilometer | 33 microns | 35 microns | 42 microns | 58 microns |
| Overall Sealer Appearance Result | Acceptable/Pass | Acceptable/Pass | Acceptable/pass | Unacceptable/Fail |
| 2 Hour Acetone 30 double rubs | Significant amount of Sealer on wipe - Fail | Significant amount of Sealer on wipe - Fail | Significant amount of Sealer on wipe - Fail | Significant amount of Sealer on wipe - Fail |
| 24 Hour Acetone 30 double rubs | Extremely Slight amount of Sealer on wipe = Pass | Extremely Slight amount of Sealer on wipe = Pass | Extremely Slight amount of Sealer on wipe = Pass | Extremely Slight amount of Sealer on wipe = Pass |
| Overall Sealer Cure Result | Acceptable/Pass | Acceptable/Pass | Acceptable/pass | Acceptable/pass |
| Tukon | 10.7 | 9.0 | 8.6 | 6.5 |
| Persoz | 75 sec. | 67 sec. | 72 sec. | 35 sec. |
| Overall Sealer Hardness Result | Acceptable/Pass | Acceptable/Pass | Acceptable/pass | Unacceptable/Fail |

Example 5

Sealer+Top Coat Application

One set of panels each was topcoated with:

1. Commercially available Axalta Cromax® Pro waterborne base coat—Solid Black/LE8700S™ premium appearance clear coat
2. Commercially available Axalta Cromax® Pro waterborne base coat—Silver Metallic/LE8700S™ premium appearance clear coat
3. Commercially available Axalta ChromaPremier® solventborne base coat—Solid Black/LE8300S™ productive clear coat
4. Commercially available Axalta ChromaPremier® solventborne base coat—Silver Metallic/LE8300S™ productive clear coat Topcoats were applied as soon as the sealers had complete gloss loss. See above dry time results for each sealer's time to topcoat. Each basecoat was applied and dried/flashed as specified on their Technical Data Sheets. Basecoats were not activated. Clear coats were activated, applied, flashed, and baked as specified on their Technical Data Sheets. All topcoats are commercially available.

Example 6

Sealer+Top Coat Results

Sealer+Top Coat Testing

All topcoated panels were left at ambient conditions for 7 days before testing. Wavescan and colorimeter measurements were taken where the sealer levels were full film (0.8-1.0 mils) and where the Sealer film was feathered in (0.1-0.3 mils). Chip and adhesion testing was done only at full film areas.

Film builds were measured using Fischerscope® MMS®.

Short wave, long wave, and DOI were taken with a Byk Wave Scan Dual.

Chip measurements were done using a Q-Panel Lab Products Multi-test Gravelometer with one pint of room temperature gravel with a feed rate of 7 and 70 psi and the panel frozen at −40° F. at 90 degrees to the path of the gravel. Adhesion was done using GM9071P tape adhesion test for paint finishes.

Color measurements and flake orientation evaluations were done by using an X-Rite MA 68II Multiangle Spectrophotometer. Absolute L values at the 15, 45, and 110 degree angles were used to evaluate course aluminum flake orientation. The FLOP value is the difference between the 110 degree L value and the 15 degree L value. The delta FLOP is the difference between the FLOP of the full film area and the FLOP of the feathered in area. The delta FLOP correlated the most with visual assessment.

Cromax® Pro Waterborne Solid Black Results

| Test Description | Sealer A | Sealer B | comparison Sealer C | comparison Sealer D |
|---|---|---|---|---|
| Sealer FB (full) | 0.82 | 0.84 | 0.79 | 0.80 |
| Basecoat FB | 0.76 | 0.80 | 0.82 | 0.76 |
| Clearcoat FB | 2.32 | 2.40 | 1.99 | 2.31 |
| Full Film short wave | 4.0 | 14.3 | 35.8 | 49.7 |
| Full Film long wave | 2.1 | 4.9 | 12.3 | 16.0 |
| Full Film DOI | 96.5 | 94.7 | 78.7 | 85.4 |
| Feathered Edge short wave | 6.0 | 18.4 | 35.7 | 48.0 |
| Feathered Edge long wave | 4.6 | 6.0 | 15.8 | 24.8 |
| Feathered Edge DOI | 96.4 | 93.6 | 78.2 | 80.4 |
| Visual Appearance Result | Acceptable/Pass | Acceptable/Pass | Unacceptable/Fail | Unacceptable/Fail |
| CHIP | 8.0 | 8.0 | 8.0 | 8.0 |
| Adhesion | X = 10, # = 100 | X = 10, # = 100 | X = 10, # = 100 | X = 9, # = 95 |
| Overall Physical Properties Result | Acceptable/Pass | Acceptable/Pass | Acceptable/Pass | Acceptable/Pass |

Cromax® Pro Waterborne Silver Metallic Results

| Test Description | Sealer A | Sealer B | comparison Sealer C | comparison Sealer D |
|---|---|---|---|---|
| Sealer FB (full) | 1.02 | 0.85 | 0.92 | 0.95 |
| Basecoat FB | 0.63 | 0.54 | 0.51 | 0.61 |
| Clearcoat FB | 2.19 | 2.31 | 2.05 | 2.17 |
| Full Film short wave | 30.1 | 36.2 | 29.3 | 47.9 |
| Full Film long wave | 2.7 | 5.5 | 15.8 | 54.9 |
| Full Film DOI | 84.6 | 85.7 | 77.1 | 74.2 |
| Feathered Edge short wave | 29.6 | 35.0 | 31.0 | 39.8 |
| Feathered Edge long wave | 3.5 | 5.5 | 12.3 | 12.3 |
| Feathered Edge DOI | 84.4 | 84.9 | 76.3 | 75.6 |
| Visual Appearance Result | Acceptable/Pass | Acceptable/Pass | Unacceptable/Fail | Unacceptable/Fail |

-continued

| Test Description | Sealer A | Sealer B | comparison Sealer C | comparison Sealer D |
|---|---|---|---|---|
| Full Film | | | | |
| 15 deg absolute L | 117.22 | 118.49 | 112.51 | 113.07 |
| 45 deg absolute L | 68.87 | 68.92 | 67.67 | 67.27 |
| 110 deg absolute L | 38.08 | 37.20 | 37.86 | 37.45 |
| FLOP | 79.14 | 81.29 | 74.65 | 75.62 |
| Feathered Edge | | | | |
| 15 deg absolute L | 116.48 | 120.16 | 109.46 | 114.12 |
| 45 deg absolute L | 69.49 | 68.92 | 65.23 | 65.34 |
| 110 deg absolute L | 37.37 | 36.71 | 39.52 | 37.16 |
| FLOP | 79.11 | 83.45 | 69.94 | 73.00 |
| Delta Flop | −0.03 | 2.16 | −4.71 | −2.62 |
| Visual Color/Flake Result | Acceptable/Pass | Acceptable/Pass | Unacceptable/Fail | Unacceptable/Fail |

Cromax ChromaPremier® Solventborne Solid Black Results

| Test Description | Sealer A | Sealer B | comparison Sealer C | comparison Sealer D |
|---|---|---|---|---|
| Sealer FB (full) | 0.79 | 0.84 | 0.95 | 0.80 |
| Basecoat FB | 0.73 | 0.73 | 0.82 | 0.80 |
| Clearcoat FB | 1.95 | 2.23 | 2.29 | 2.24 |
| Full Film short wave | 8.6 | 20.2 | 40.4 | 47.9 |
| Full Film long wave | 2.0 | 7.4 | 14.2 | 16.1 |
| Full Film DOI | 92.8 | 90.1 | 87.0 | 85.2 |
| Feathered Edge short wave | 8.4 | 21.1 | 44.9 | 45.7 |
| Feathered Edge long wave | 2.6 | 9.5 | 13.3 | 21.7 |
| Feathered Edge DOI | 91.3 | 89.7 | 82.2 | 84.4 |
| Visual Appearance Result | Acceptable/Pass | Acceptable/Pass | Unacceptable/Fail | Unacceptable/Fail |
| CHIP | 8.5 | 8.0 | 8.0 | 8.0 |
| Adhesion | X = 9, # = 100 | X = 10, # = 100 | X = 10, # = 95 | X = 10, # = 100 |
| Overall Physical Properties Result | Acceptable/Pass | Acceptable/Pass | Acceptable/Pass | Acceptable/Pass |

Cromax ChromaPremier® Solventborne Silver Metallic Results

| Test Description | Sealer A | Sealer B | comparison Sealer C | comparison Sealer D |
|---|---|---|---|---|
| Sealer FB (full) | 0.96 | 0.95 | 0.92 | 0.85 |
| Basecoat FB | 0.63 | 0.67 | 0.66 | 0.58 |
| Clearcoat FB | 2.23 | 2.08 | 2.25 | 2.15 |
| Full Film short wave | 25.7 | 21.0 | 24.3 | 44.1 |
| Full Film long wave | 4.4 | 6.0 | 10.1 | 14.0 |
| Full Film DOI | 76.8 | 77.5 | 74.8 | 70.1 |
| Feathered Edge short wave | 29.3 | 33.7 | 40.8 | 40.3 |
| Feathered Edge long wave | 4.7 | 6.3 | 10.8 | 27.1 |
| Feathered Edge DOI | 77.4 | 78.0 | 76.3 | 69.7 |
| Visual Appearance Result | Acceptable/Pass | Acceptable/Pass | Acceptable/Pass | Unacceptable/Fail |
| Full Film | | | | |
| 15 deg absolute L | 120.17 | 120.81 | 119.36 | 118.27 |
| 45 deg absolute L | 667.47 | 66.89 | 68.70 | 67.29 |
| 110 deg absolute L | 36.30 | 35.72 | 37.12 | 37.32 |
| FLOP | 83.87 | 85.09 | 81.24 | 80.95 |
| Feathered Edge | | | | |
| 15 deg absolute L | 120.68 | 120.62 | 116.81 | 114.48 |
| 45 deg absolute L | 67.14 | 66.90 | 67.69 | 69.48 |

-continued

| Test Description | Sealer A | Sealer B | comparison Sealer C | comparison Sealer D |
|---|---|---|---|---|
| 110 deg absolute L | 36.50 | 35.93 | 37.44 | 38.63 |
| FLOP | 84.18 | 84.69 | 79.37 | 75.85 |
| Delta Flop | 0.31 | −0.40 | −2.87 | −5.10 |
| Visual Color/Flake Result | Acceptable/Pass | Acceptable/Pass | Unacceptable/Fail | Unacceptable/Fail |

The PUR and Latex Resin are best when used in combination as in Sealer example A, with example B combination a close second. When either of the resins is used in combination with a different (comparative) resin, some attributes start to deteriorate.

The refinish urethane waterborne Sealer product made with both resins is superior to previous art refinish waterborne Sealers: it has the ability to topcoat in less than half the time of prior art refinish waterborne Sealers without losing appearance or adversely affecting metallic flake/color of the topcoat; and it is a true two component urethane that has good film strength.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It is understood that various changes may be made in the function and arrangement of elements described in an exemplary embodiment without departing from the scope of the disclosure as set forth in the appended claims.

What is claimed is:

1. A water-borne sealer composition comprising:
   an acrylic latex resin;
   a polyurethane dispersion (PUD); a rust inhibitor;
   an activator, wherein the activator comprises a polyisocyanate crosslinker having an isocyanate functionality of greater than 2; and
   water, wherein the acrylic latex resin is a fully crosslinked acrylic latex resin free of a core-shell latex, and wherein the PUD comprises a hydroxyl functional reaction product of a polyisocyanate and a polyol comprising a polycarbonate diol.

2. The water-borne sealer composition of claim 1, further comprising one or more pigments.

3. The water-borne sealer composition of claim 1, wherein the polyisocyanate comprises hexane diisocyanate.

4. The water-borne sealer composition of claim 1, wherein the crosslinker is an isocyanurate.

5. The water-borne sealer composition of claim 1, wherein the polyol comprises a polyester and a polycarbonate diol.

6. A multilayer coated substrate comprising:
   a) a substrate;
   b) a sealer composition applied directly on the substrate; and
   c) at least one topcoat applied on top of the sealer composition, wherein the sealer composition is the water-borne sealant composition according to claim 1.

7. The multilayer coated substrate of claim 6, wherein the substrate comprises a base substrate and a primer applied on top of the base substrate, and wherein the sealer composition is applied on top of the primer.

8. The multilayer coated substrate of claim 6, wherein the substrate comprises a base substrate and an electrocoat applied on top of the base substrate, and the sealer composition is applied on top of the electrocoat.

9. The multilayer coated substrate of claim 6, wherein the substrate comprises a base substrate selected from aluminum and steel.

10. The multilayer coated substrate of claim 6, wherein the multilayer coated substrate is a painted vehicle component.

11. A method of building up a multilayer coating on a substrate, comprising:
    a) applying the water-borne sealer composition according to claim 1 on top of the substrate to make a sealer coat; and
    b) applying at least one topcoat on top of the sealer coat.

12. The method of claim 11, wherein the substrate comprises a base substrate and a primer applied on top of the base substrate, and wherein the water-borne sealer composition is applied on top of the primer.

13. The method of claim 11, wherein the substrate comprises a base substrate and an electrocoat applied on top of the base substrate, and the water-borne sealer composition is applied on top of the electrocoat.

14. The method of claim 11, wherein the substrate comprises a base substrate selected from aluminum and steel.

15. The method of claim 11, wherein the product of step b) is a painted vehicle component.

16. The method of claim 11, comprising allowing the sealer coat to flash before applying the topcoat.

17. The method of claim 16, wherein the topcoat is applied before the sealer coat reaches a coalesced state.

18. The method of claim 16, wherein the topcoat is applied before the sealer coat is matte.

19. The water-borne sealer composition of claim 1, wherein the fully crosslinked acrylic latex resin has a crosslinked structure resulting from the use of olefinically polyunsaturated monomers in all the stages of an emulsion polymerization that produces the fully crosslinked acrylic latex resin.

* * * * *